A. E. SMITH.

Axle-Box.

No. 57,987.

Patented Sept. 11, 1866.

Witnesses:

Inventor:

UNITED STATES PATENT OFFICE.

ALFRED E. SMITH, OF BRONXVILLE, NEW YORK.

IMPROVEMENT IN AXLE-BOXES FOR WAGONS.

Specification forming part of Letters Patent No. 57,987, dated September 11, 1866.

*To all whom it may concern:*

Be it known that I, ALFRED E. SMITH, of Bronxville, Westchester county, State of New York, have invented certain new and useful Improvements in the Manufacture of Axle-Boxes for Wagons and other Vehicles; and I do hereby declare that the following is a full description of the same.

The object of my new manufacture of axle-boxes is to dispense with the lugs commonly formed on the outer surface of the boxes and extending nearly down the length of them, so that their outsides may be turned off in a lathe their entire length, and thus be more perfectly centered in the hub than can possibly be attained where the lugs are retained on the sides of the box and channels formed in the hub for the lugs to fit in; and the nature of my new manufacture of axle-boxes consists in forming on the butt-end of the axle-box a series of teeth, somewhat larger in diameter than the back end of the box and the bore in the hub, so that by driving the box into the hub the teeth will engage in the wood, and thus form their own seat, and prevent the box from turning in the hub.

But to describe my new manufacture of axle-boxes more particularly, I will refer to the accompanying drawings, forming a part of this specification, the same letters of reference, wherever they occur, referring to like parts.

Figure 1:
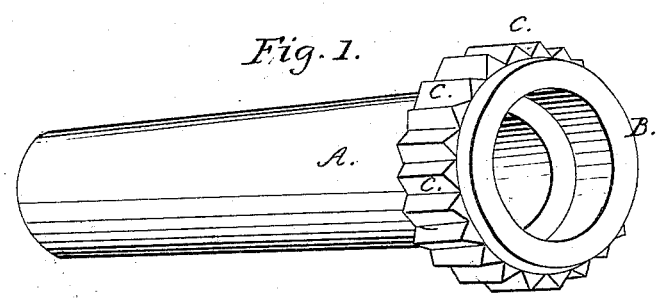
Figure 2:
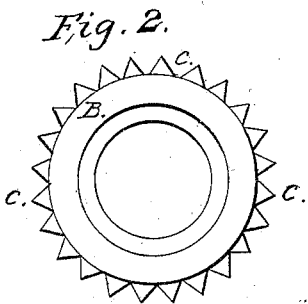

Figure 1 is a perspective view of the axle-box. Fig. 2 is a butt or back end view of the same.

Letter A is the axle-box, which is made of cast-iron or other suitable metal, and having on its back end a shoulder or collar-like formation of metal, B, of some half an inch, more or less, greater diameter than the body of the box, and about half an inch in depth, more or less, from the end of it. The object of this is, first, to admit of boring out a seat in the end of the box for a shoulder on the axle, and, second, to admit of cutting on the outer circumference of the collar a series of saw-like teeth, c. The depth of these teeth are about the eighth of an inch, though they may be varied according to the size of the hub in which the box is to be inserted.

The body of the box is turned off perfectly true and parallel with the bore of the axle up to the butt-end of the box. The object of this is to enable the wheelwright to center the hub perfectly true in inserting the box.

In the ordinary axle-boxes having lugs on them half-way down their sides the box is always out of true with the line of the axle-tree unless great care is taken to fit the boxes in the hubs. To do this more or less of the bore of the hub has to be cut out, and then the box packed round with wedges of wood to get it properly centered.

By my improvement the hub is bored of the proper diameter for the body of the box and a recess for the shoulder, less the diameter of the depth of the teeth formed in its back end, when the box may be inserted and driven home, making a perfect center to the hub, and at the same time securing the box in the hub much more firmly than could be obtained by the use of lugs and wedging.

It will be obvious, also, that by my improved axle-box I avoid the risk of weakening the hub, especially of very small fancy wagon-hubs, by cutting away the interior of them for the insertion of the lugs.

By my improvement the body of the box is reduced down to the least possible thickness of metal, therefore making the bore in the hub very small, while, by the formation of the shoulder on the butt of the box, I get all the requisite strength for the security of the box, besides retaining more strength in the hub to support the ends of the spokes.

Having now described my new manufacture of axle-boxes for wagons and other vehicles, I will proceed to set forth what I claim and desire to secure by Letters Patent of the United States.

What I claim is—

1. The new manufacture of axle-boxes for wagons and other vehicles, by forming on their butt-ends a raised shoulder having a series of teeth cut therein to engage in the back end of the hub, in contradistinction to the use of lugs to secure the boxes in the hub.

2. The making of the axle-box perfectly cylindrical throughout the length of it, so that by boring the hub with a true center the box will fit it without the necessity of cutting any grooves or channels in the hub, for the purposes hereinbefore set forth.

ALFRED E. SMITH.

Witnesses:
C. L. BARRETT,
JOHN STUART.